United States Patent
Smuck

[15] 3,701,237
[45] Oct. 31, 1972

[54] SMOKE ELIMINATOR

[72] Inventor: Harry A. Smuck, 6050 Ritchie Highway, Anne Arundel County, Md. 21061

[22] Filed: March 10, 1972

[21] Appl. No.: 233,808

Related U.S. Application Data

[63] Continuation of Ser. No. 12,763, Feb. 19, 1970, abandoned.

[52] U.S. Cl. ..................55/230, 55/345, 55/403, 261/22, 261/88, 261/DIG. 9
[51] Int. Cl. ..............................B01d 45/10
[58] Field of Search................55/230–231, 345, 55/240, 401–405; 261/21, 22, 25, 30, 36, 88–90

[56] References Cited

UNITED STATES PATENTS

| | | | |
|---|---|---|---|
| 679,761 | 8/1901 | Lion | 261/89 |
| 797,661 | 8/1905 | Cline | 261/89 |
| 2,228,425 | 1/1941 | Venderbush | 261/90 |
| 1,083,068 | 12/1913 | Egler | 261/89 |

Primary Examiner—Tim R. Miles
Assistant Examiner—Vincent Gifford
Attorney—J. Wesley Everett et al.

[57] ABSTRACT

A gas scrubber and purifier for the exhaust gases from incinerators, furnaces and the like, the exhaust gases being forcibly passed through water curtains and sprays produced by revolving discs which throw water by centrifugal force through which the exhaust gases are forced to pass to capture any fine solid matter such as dust, fly ash and the like and to dissolve any soluble gaseous ingredient in the exhaust gases.

1 Claim, 3 Drawing Figures

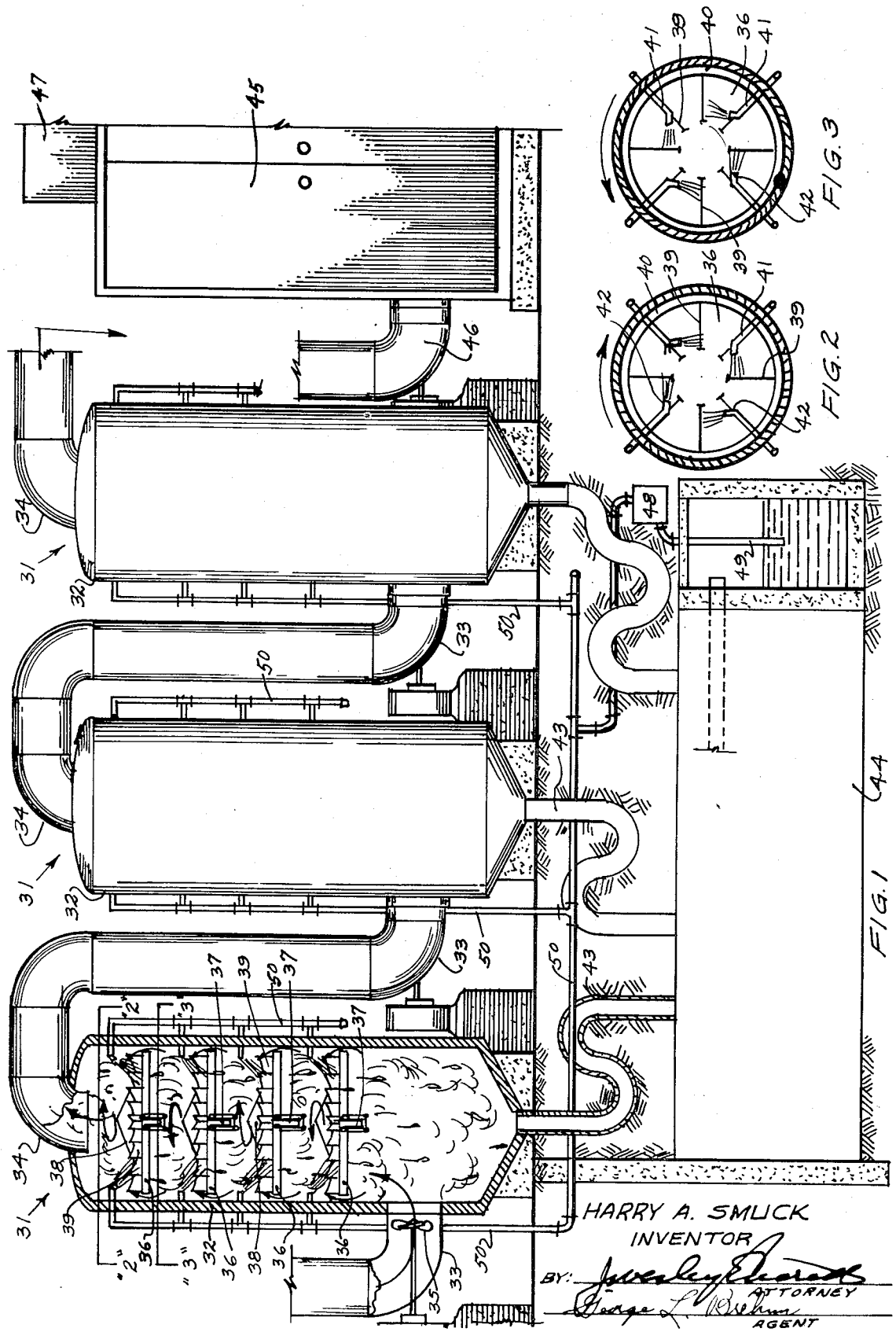

SMOKE ELIMINATOR

This application is a continuation of application Ser. No. 12,763, filed Feb. 19, 1970, now abandoned.

The instant invention generally relates to purifiers for the exhaust gases from industrial furnaces, boilers, garbage and trash incinerators and the like and more specifically relates to such purifiers which are known as "scrubbers" and which utilize a water spray or curtain through which the exhaust gases to be cleaned are passed, to remove any fine solid material such as dust, fly ash and the like and to dissolve any soluble matter from the gases so that only entirely inert and harmless gases are passed into the atmosphere.

Smog, smoke and other forms of air pollution have become an increasing matter of concern, especially around thickly populated areas, in fact, laws and ordinances to restrict industries as to what may be discharged into the atmosphere and various restrictions on open burning of trash by individuals and commercial trash disposal concerns are fast becoming the rule. It was with this in mind that the present invention was concieved and it is believed that its use will be a definite step in the general solution of the air pollution problem.

It is the primary object of my invention to produce an exhaust gas scrubber which will substantially eliminate objectionable and obnoxious elements from the products of combustion of commercial furnaces, incinerators and the like and allow only harmless and inert gases to be discharged into the atmosphere.

It is another object to produce such a device which will be relatively simple in construction and reliable in operation requiring a minimum of servicing and repairs.

The above and other objects and advantages will become more apparent as this description proceeds and reference is had to the accompanying drawings forming a part of this specification. In said drawings:

FIG. 1 is an elevational view partly in section of an exhaust gas scrubber and purifier embodying my invention;

FIG. 2 is a sectional view on line 2—2 of FIG. 1; and

FIG. 3 is a sectional view on line 3—3 of FIG. 1.

Referring now more in detail to the drawing and for the present to FIG. 1 thereof, reference numeral 31 generally indicates a scrubber, one or more of which may be used to purify the exhaust gases from a furnace, incinerator or the like. If more than one is used they are connected in series as shown. As each of the scrubbers is a duplicate of the next, a description of one will suffice for all.

Each scrubber consists of an outer housing 32 with an intake 33 for gases to be purified at its lower portion and an outlet at its top at 34.

To assist the gases into and through the scrubber, a fan 35 is located in the intake 33.

Located within the housing 32 between the top thereof to a point somewhat above the intake 33 for the gases, a series of vertically spaced rotary discs 36 are mounted. These discs are arranged to be freely rotatable on vertical axes 37 and each disc is somewhat conically peaked at 38 and is provided with upstanding radially arranged fins 39. The circumferential edges of the discs are spaced slightly at 40 from the inner wall of the casing 32 to provide a circular open area around the discs for the passage of gases and fluid as described in the following.

One or more water jets 41 is positioned above each disc and its nozzle 42 is pointed to direct a stream of water secantwise across the disc and impinge against the fins 39 and cause the disc to rotate. Through rotation of the disc the water is thrown outwardly by centrifugal force against the inner wall of casing 32. Each disc is made to rotate in an opposite direction from the disc above or below it by properly directing the nozzle or nozzles operating each disc.

In operation of the scrubber the products of combustion to be cleaned are conducted from the exhaust duct of the incinerator furnace or the like and into the intake duct 33 of the scrubber, being assisted and propelled by the fan 35. These gases enter the lower portion of the scrubber below the rotating discs. They must then pass upwardly around the outer peripheries of the rotating discs and there be encountered by the spray of water being thrown outwardly by the discs. The encounter of water with the gases will capture any small solid particles such as fly ash and any soluble gaseous substances which the products of combustion contain and carry them downwardly through the drain pipe 43 and into a settlement tank 44.

The scrubbed duct cleaned gases then pass upwardly and outwardly through outlet duet 34 and may then be exhausted to the atmosphere or be conducted through one or more additional scrubbers as the need may indicate and as shown in the drawing. Each of the additional scrubbers functions exactly as the first above described and each additional scrubber will further refine the exhaust gases.

As a final step, a glass wool filter (not shown) but enclosed in a cabinet shown at 45 may be employed. If used, gases from the outlet duct 34 of the final scrubber are introduced to this filter through duct 46 and exhausted through outlet duct 47.

Water from the jets 41 which is drained into the settlement tank 44 may be recirculated after sediment etc. has precipitated. For this purpose a pump 48 receiving water through intake pipe 49 from the settlement tank feeds the water to the jets through supply pipes 50.

Having described a preferred form of my invention, what I claim as new and desire to secure by Letters Patent is:

1. An improvement in an exhaust gas scrubber system comprising:
   a. a plurality of vertical supported elongated cylindrical chambers arranged in relatively close relationship, each of said chambers having a gas inlet and gas outlet openings;
   b. gas conveying ducts connecting the inlet and outlet openings of the several chambers in series whereby gas passing out of one chamber is introduced into the inlet opening in another chamber, the inlet opening in the first chamber in the series operating to receive the gas to be scrubbed, and the outlet in the last chamber in the series operating to release the gas from the scrubber;
   c. a plurality of individual freely rotatable circular discs positioned in each of the chambers and spaced apart one above the other in each of the said chambers, supporting means for supporting said rotatable discs in a vertical axis within a predetermined location within each of the said chambers, each of the said discs being tapered downwardly and outwardly toward its outer edge, said discs being mounted in a plane perpendicular to the vertical axis of the chamber and having a diameter slightly less than the inside diameter of the circular chamber thereby allowing a uniform narrow space between the outer peripheral edge of the disc and the inner side of the chamber as the discs are rotated, the area of the space between the periphery of the several discs and the inner side of the chamber being such as to readily accommodate the gas passing upwardly through the scrubber;

d. a plurality of upstanding fins positioned on the upper side of each of the said discs and adjacent at least the peripheral edge thereof;

e. a plurality of stationary water supply means for supplying water under pressure located adjacent and above each of the discs and positioned to direct a stream of water under pressure against the corresponding sides of the fins on each alternate disc for rotating each disc in the same direction, and a plurality of stationary water supply means for supplying water under pressure located adjacent and above each of the remaining discs to direct a stream of water under pressure against the opposite sides of the fins of the remaining discs for rotating the same in a direction opposite the rotation of the first-mentioned discs;

f. the water supply means positioned to rotate each disc in a predetermined direction;

g. means provided for circulating the gas through the said scrubber.

* * * * *